Patented Nov. 25, 1941

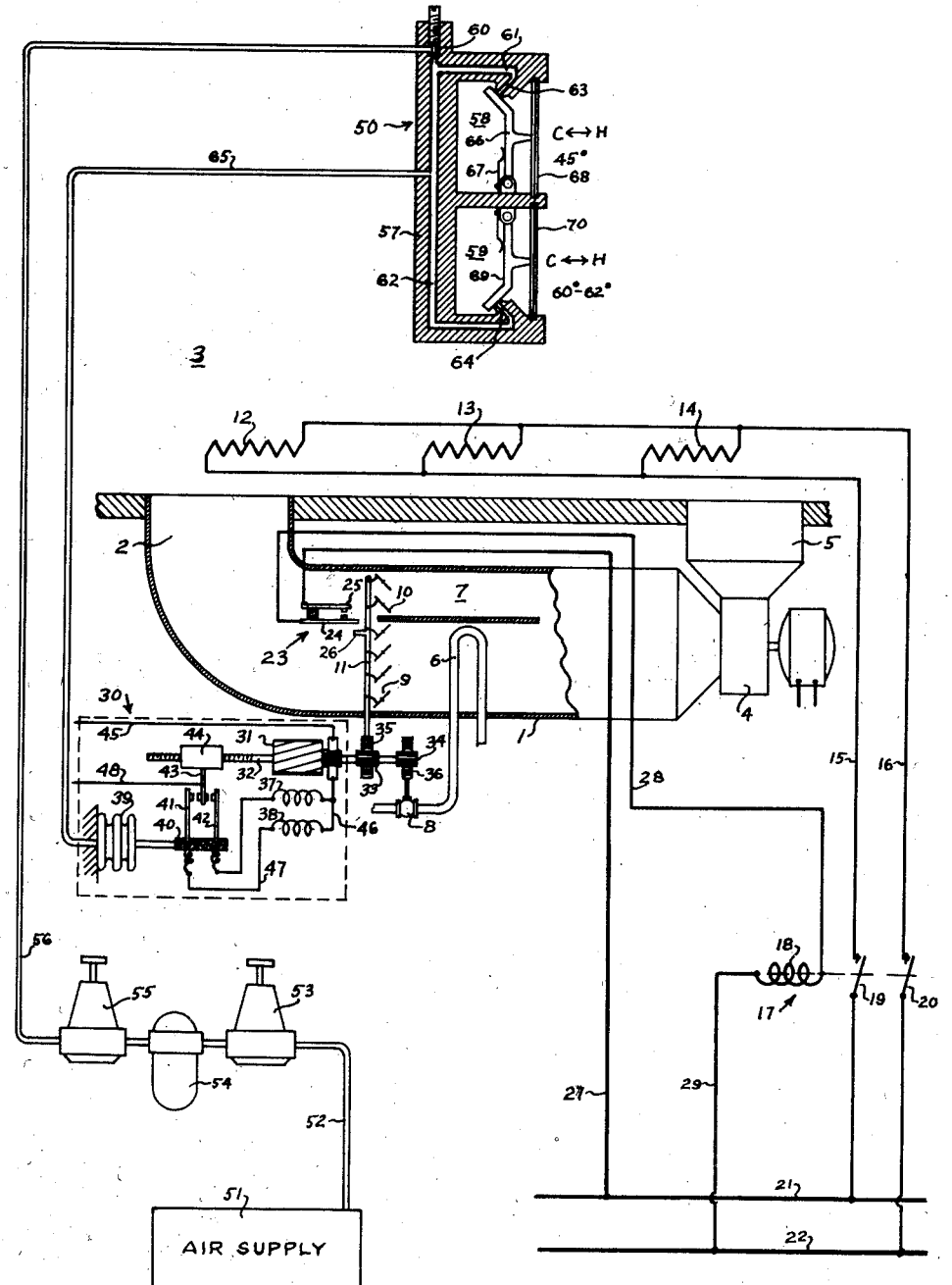

2,263,742

UNITED STATES PATENT OFFICE 2,263,742

CONTROL SYSTEM

Paul F. Shivers, Wabash, Ind., assignor to Minneapolis-Honeywell Regulator Company, Minneapolis, Minn., a corporation of Delaware Application May 13, 1938, Serial No. 207,759

6 Claims. (Cl. 236—36)

This invention relates in general to control apparatus and is more particularly concerned with pneumatic control apparatus for providing sequential or step control of a single or plurality of devices to be controlled.

More specifically, it is an object of my invention to provide a pneumatic control system which utilizes a plurality of control devices connected to simultaneously control a single device to be controlled, for providing sequential actuation of the device to be controlled by the plurality of controllers.

A further object of my invention is to provide a control system utilizing a motor means for positioning a controlled device, with an arrangement for preventing the motor means from driving the device to be controlled to an extreme position for one condition of operation, while causing movement of the device to be controlled to its extreme position for another condition of operation.

A still further object of my invention is the provision of a control system which is especially adapted for installations wherein considerable vibration occurs, and which will control accurately and positively regardless of such vibration.

Other objects of this invention will become apparent from the following description and the appended claims.

For a full disclosure of my invention, reference is made to the following detailed description and to the accompanying drawings, the single figure of which illustrates a preferred form of my invention as applied to a street-car heating system.

Referring to the drawing, reference character 1 indicates a heating chamber for heating air being discharged into a space, such for instance as the interior of a street-car. This heating chamber is provided with an inlet duct 2 which leads from the space being heated 3, and is also connected to a fan 4 which draws air through the chamber 1 and discharges it into the space through a discharge duct 5. Located within chamber 1 is a heating coil 6, this heating coil extending but part way across the chamber 1 to provide a by-pass passage 7. The heating coil 6 is connected to a control valve 8 which controls the flow of heating medium into the coil 6. The coil 6 may be supplied with any suitable heating medium depending upon the particular installation. For instance, if the system is utilized for heating the interior of a street-car, the coil 6 may be provided with a heating medium which is heated by a regenerative braking system for the car, thereby utilizing heat which would normally be wasted for heating the car.

Reference characters 9 and 10 indicate face and by-pass dampers, respectively, for controlling the proportions of air passed across the coil 6 and through the by-pass 7. The dampers 9 and 10 may be actuated in unison by means of an actuating member 11 which is connected to the damper blades in a manner to cause movement of the dampers 9 and 10 in unison but in opposite manners, to thereby cause closing of the by-pass damper 10 upon opening of the face damper 9, and vice versa.

Reference characters 12, 13, and 14 indicate suitable electric heating elements located within the space 3 for supplementing the heating action of the coil 6 whenever this coil fails to deliver enough heat for heating the space. These heaters are indicated as being connected in parallel to wires 15 and 16 leading from a relay 17. This relay 17 may be of any suitable type and is indicated diagrammatically as comprising a relay coil 18 which actuates a pair of switch arms 19 and 20 through a suitable armature. When the coil 18 is energized, the switch arms 19 and 20 will be brought into engagement with their respective contacts and this will connect the wires 15 and 16 to the line wires 21 and 22, thereby energizing the heaters 12, 13, and 14. When the coil 18 is deenergized, the switch arms 19 and 20 will move to the right under the action of gravity or springs (not shown), this causing the heaters 12, 13, and 14 to be deenergized.

For controlling the relay coil 18, I preferably employ an auxiliary switch 23 which is actuated by the motor which actuates the face and by-pass dampers 9 and 10. The switch 23 is diagrammatically illustrated as comprising a pair of contact arms 24 and 25, the contact arm 24 being illustrated for convenience as actuated by means of a lug 26 on the member 11. When the face damper 9 is wide open, the member 11 will be at its topmost position, this causing the contact arm 24 to be brought into engagement with contact arm 25. These contact arms, it will be noted, are connected by wires 27, 28, and 29 in series with the relay coil 18 across the line wires 21 and 22. Therefore, when the face damper 9 is wide open, the auxiliary switch 23 will be closed, this causing energization of the coil 18 for energizing the electric heating elements 12, 13, and 14. When, however, the face damper 9 is not completely open, the auxiliary switch 23 will be open, this causing the relay coil 18 to be deenergized, thus deenergizing the heaters 12, 13, and 14 at this time. It will therefore be seen that the heating elements 12, 13, and 14 are energized only when the face damper 9 becomes wide open.

In order to actuate the valve 8 and the dampers 9 and 10, I preferably utilize what I term an air-electric motor 30. This motor is indicated diagrammatically as comprising an armature 31 which is adapted to rotate a shaft 32 through a suitable gear train (not shown). The shaft 32 may actuate the member 11 and valve 8 in any suitable manner, this for illustrative purposes being indicated by pinions 33 and 34 operating racks 35 and 36, respectively. By this arrangement when the shaft 32 is rotated in one direction, the valve 8 will be opened and simultaneously the face damper 9 will be opened, and the by-pass damper 10 closed. When the shaft 32 is rotated in the opposite direction, the valve 8 and the face damper 9 will be simultaneously moved towards closed position, while the by-pass damper 10 is moved towards open position.

The armature 31 may cooperate with a pair of field coils 37 and 38. It will be understood that when the field coil 37 is energized, the armature 31 will rotate in one direction, while when the coil 38 is energized the armature 31 will rotate in the opposite direction. When both coils 37 and 38 are deenergized, the armature 31 will remain stationary. Selective energization of the coils 37 and 38 is controlled by means of a relay which may comprise a bellows 39 which actuates a contact carrier 40 of insulating material, this contact carrier carrying contacts 41 and 42. The contacts 41 and 42 cooperate with a contact 43 which is mounted upon a nut 44 of insulating material which is mounted upon a threaded portion of the shaft 32. Assuming now that the motor is at rest, if the pressure within bellows 39 is increased, this bellows will expand thus moving the contact carrier to the right, this bringing the contact 41 into engagement with the contact 43, which will energize the armature 31 and field coil 38 as follows: wire 45, armature 31, wire 46, field coil 38, wire 47, contact 41, and contact 43 to wire 48. Energization of the armature 31 and field coil 38 will cause rotation of the shaft 32 in a direction to close the valve 8 and face damper 9, thus decreasing the amount of heat being supplied to the space. Simultaneously, the nut 44 will travel to the right along shaft 32 due to rotation of the shaft 32, thereby causing the contact 43 to eventually disengage the contact 41 for stopping the motor. It will be apparent that upon a decrease in pressure within the bellows 39, the contact 42 will be brought into engagement with the contact 43 for causing rotation of the shaft 32 in the opposite direction. It should also be apparent that due to the follow-up arrangement just described, the positions of the valve 8 and dampers 9 and 10 will be varied upon variation in pressure within the bellows 39, there being a corresponding position of each of these devices for each value of pressure applied to the bellows 39.

The pressure within the bellows 39 is controlled by means of a two stage thermostat 50 which may be located within the space being heated, or within the return air duct 2. Reference character 51 indicates a suitable source of compressed air and if desired may be taken from the braking system of the street-car. The air supply tank 51 may be connected to pipe 52 which, in turn, is connected to a reducing valve 53 which discharges into filter 54. The filter 54 may be connected to a second reducing valve 55 which in turn is connected by an air supply pipe 56 to the thermostat 50.

Referring now to the thermostat 50, this thermostat may comprise a base member 57 formed to provide chambers 58 and 59. The base member 57 also provides a housing for a needle valve or adjustable restriction 60, the inlet of which is connected to the air supply pipe 56 and the outlet of which is connected to passages 61 and 62 which lead to bleed ports 63 and 64 located within the chambers 58 and 59, respectively. The passage 62 is also connected to the bellows 39 of the air-electric motor by means of pipe 65. Located within the chamber 58 is a pivoted flapper valve member 66, this valve member being urged towards the port 63 by a spring 67. This member is actuated by means of a bimetallic element 68 which may be formed as a disc covering the chamber 58. Upon rise in temperature, the center of this bimetallic element will warp to the right thus permitting the valve member 66 to approach the port 63. Located within the chamber 59 is a valve member 69 which cooperates with the port 64, this valve member being actuated by means of a bimetallic element 70.

The bimetallic element 70 may be arranged in a manner for causing the valve 69 to engage and close the port 64 when the temperature at the thermostat rises to a predetermined high value which may be, for instance, 62° F. As the temperature at the thermostat falls, the center of this bimetallic element will warp to the left for causing the valve member 69 to move away from the port 64, thereby allowing air to bleed through this port for reducing the pressure applied to the diaphragm 39. The bimetallic element 68 in turn may be arranged so as to maintain the valve member 66 in engagement with the port 63 until the temperature at the thermostat falls to a value below the setting of the element 70. For instance, the element 68 may be so adjusted as to cause the member 66 to engage port 63 until the temperature at the thermostat falls to 45° F.

It will be apparent that when the temperature at the thermostat is above the setting of the bimetallic member 68, the thermostat formed of bimetallic element 70 and valve member 69 will be in complete control of the pressure applied to the bellows 39. Thus when the temperature at the thermostat is above 62° F., the valve member 69 will cover the port 64 and will cause the maximum pressure to be applied to bellows 39, and this will cause closing of the valve 8 and closing of the face damper 9 and opening of the by-pass damper 10 in the manner previously described. Upon fall in space temperature, the valve member 69 will be shifted away from the port 64 thereby allowing air to bleed therefrom. Due to the restricted air supply caused by restriction 60, the pressure applied to the bellows 39 will decrease, this causing the motor 30 to open valve 8 and the face damper 9 an amount proportionate to the fall in temperature below 62° F. When the space temperature falls to 60° F., the valve 69 will be removed sufficiently from the port 64 to cause the bleeding from port 64 to be at a maximum. An important feature of the present invention is the forming of the port 64 of sufficiently small dimensions as to prevent complete venting of the bellows 39 even when the bleed from port 64 is at a maximum. This renders the port 64 incapable of causing movement of the motor 30 for opening the face damper 9 wide, and thus prevents the port 64 from causing the auxiliary switch 23 to be closed. Therefore the controller formed of bimetal 70 and valve member 69 will cause modulation of the valve 8 and dampers 9 and 10 in a manner tending to maintain a constant space temperature but will not permit the heaters 12, 13 and 14 to be brought into operation.

Upon further fall in temperature at the thermostat, the valve 8 and face damper 9 will remain in substantially wide open position but will not be sufficiently open as to cause closing of the switch 23. Finally, when the space temperature falls to the minimum desired value as determined by the setting of bimetal 68, the valve member 66 will disengage the port 63 thereby further venting the bellows 39 and causing movement of the motor 30 for closing the auxiliary switch 23, thus placing the electric heating elements 12, 13, and 14 into operation.

From the foregoing description, it will be apparent that as the motor 30 rotates from one end of its range of rotation or movement towards the other, it gradually opens the face damper 9 while having no effect upon auxiliary switch 23 until the face damper is substantially wide open. Upon continued movement of the motor after the face damper is substantially wide open, the auxiliary switch is actuated. Therefore, the total range of movement of the motor may be considered as divided into two portions, the motor when its position is within one portion of its range of movement operating only the damper without operating the auxiliary switch, and when in the other portion of its range of movement operating both the damper and the auxiliary switch.

The control system which I have shown and described, it will be noted, is especially adapted for controlling in installations wherein there is considerable vibration, for the reason that due to the sluggish nature of the compressed air system between the thermostat and motor 30, the pressure applied to the bellows 39 of the motor 30 will vary slowly and consequently movement of the valve member 69 due to vibration will not result in immediate movement of the motor 30 as would occur in an all electric control system. It should also be apparent from the foregoing description, that I have provided a control system which will provide for sequential control thus permitting modulating control of valves, dampers, or other controlling devices when the condition to be controlled is within a predetermined range of values, while preventing the control device from reaching an extreme position, and which permits the controlled device to reach an extreme position only when the condition being controlled reaches a predetermined different value. While I have shown and described my invention as applied to a street-car heating control system, it will be understood that its application is not limited to systems of this type, and may be applied to any other installation where a control of this nature is desired. Also while I have illustrated the motor 30 as controlling a valve and damper simultaneously, it will be apparent that this motor may control either one alone or may control any suitable control device. Furthermore, while I preferably utilize the air electric motor in a system wherein vibration occurs, it will be apparent that in many stationary installations the thermostat 50 may control a direct acting type of pneumatic motor. In addition, while a system utilizing air under pressure is illustrated, it will be obvious that if desired, air below atmosphere pressure may be utilized instead. This would require merely the connecting of pipe 56 to a vacuum tank instead of to a source of air under pressure, and a reversal in connections of motor field coils 37 and 38. As many modifications and adaptations of my invention will occur to those skilled in the art, I desire to be limited only by the scope of the appended claims.

I claim as my invention:

1. In a system of the class described, in combination, primary heating means for heating a space, auxiliary heating means, a controller for graduatingly varying the output of the primary heating means, a control device for said auxiliary heating means, a motor for actuating said controller and said control device, said motor being arranged so that upon movement in one direction it first increases the output of the primary heating means and upon reaching a predetermined position actuates said control device for placing said auxiliary heating means into operation, a first thermostatic control means for controlling said motor and including means for limiting its effect on said motor in a manner to prevent it from causing movement of said motor to said predetermined position for thereby preventing said first thermostatic control means from placing said auxiliary heating means into operation, and a second thermostatic control means for causing movement of said motor to said predetermined position when the temperature at said second thermostatic control means falls to a predetermined value for thereby placing said auxiliary heating means into operation.

2. In a system of the class described, in combination, a first condition changer for changing the heat content of the air in a space, a second condition changer for changing the heat content of the air in said space, a first control device for controlling the first condition changer, a second control device for controlling the second condition changer, a motor for controlling said first control device and said second control device in sequence, said motor being arranged to actuate one of said control devices for placing one of the condition changers in operation only when the motor reaches a predetermined position, a first controlling means for controlling the motor in a manner to control the other of said condition changers, said first controlling means being incapable of causing movement of the motor to said predetermined position, and a second controlling means for controlling said motor means and being capable of causing movement of the motor to said predetermined position.

3. In a system of the class described, in combination, a first condition changer for changing the heat content of the air in a space, a second condition changer for changing the heat content of the air in said space, a first control device for graduatingly controlling the first condition changer, a second control device for placing said second condition changer into and out of operation, a motor for graduatingly actuating said first control device and for actuating said second control device in a manner to place the second condition changer into operation when the motor reaches a predetermined position, a first condition responsive means for graduatingly controlling said motor, said first condition responsive means being incapable of causing movement of said motor to said predetermined position, and a second condition responsive means for causing movement of said motor to said predetermined position when the condition to which the second condition responsive means responds varies to a predetermined value.

4. In a system of the class described, in combination, a first condition changer for changing the heat content of the air in a space, a second condition changer for changing the heat content of the air in said space, a first control device for graduatingly controlling the first condition changer, a second control device for placing said second condition changer into and out of operation, a pressure controlled motor for graduatingly actuating said first control device and for actuating said second control device in a manner to place the second condition changer into operation when the motor reaches a predetermined position, said motor approaching said predetermined position as the control pressure is decreased in value, a first condition responsive valve means for graduatingly controlling said motor, said first condition responsive valve means being incapable of reducing the control pressure sufficiently to cause said motor to reach said predetermined position, and a second condition responsive valve means for reducing the control pressure to a value causing travel of the motor to said predetermined position when the condition to which the second condition responsive means responds varies to a predetermined value.

5. In a control system of the class described, in combination, a device to be variably positioned, a fluid pressure controlled motor for variably positioning said device in accordance with the fluid pressure in said motor, a source of fluid pressure communicating with said motor, first and second valve means which communicate with said motor independently of each other for venting pressure fluid therefrom, and condition responsive means controlling said first valve means to variably position said device by reducing the pressure in said motor in accordance with said condition, said second valve means limiting the value to which the pressure can be reduced in said motor by said first valve means, said condition responsive means operating said second valve means to reduce the pressure in said motor beyond said limit whereby said motor actuates said device to its limit position.

6. In a control system of the class described, in combination, a device to be variably positioned, a fluid pressure controlled motor for variably positioning said device in accordance with the fluid pressure in said motor, a source of fluid pressure communicating with said motor, means for reducing the fluid pressure in said motor including two exhaust ports, a first condition responsive valve controlling the flow through one of said ports for graduatingly varying the pressure in said motor from a maximum to an intermediate value, and a second condition responsive valve controlling the flow through the other port for reducing the pressure in said motor to a minimum value, said valves being controlled sequentially on variations in the value of said condition.

PAUL F. SHIVERS.